R. A. MATHER.
RECTIFYING CURVE.
APPLICATION FILED MAY 25, 1909.
992,371.
Patented May 16, 1911.
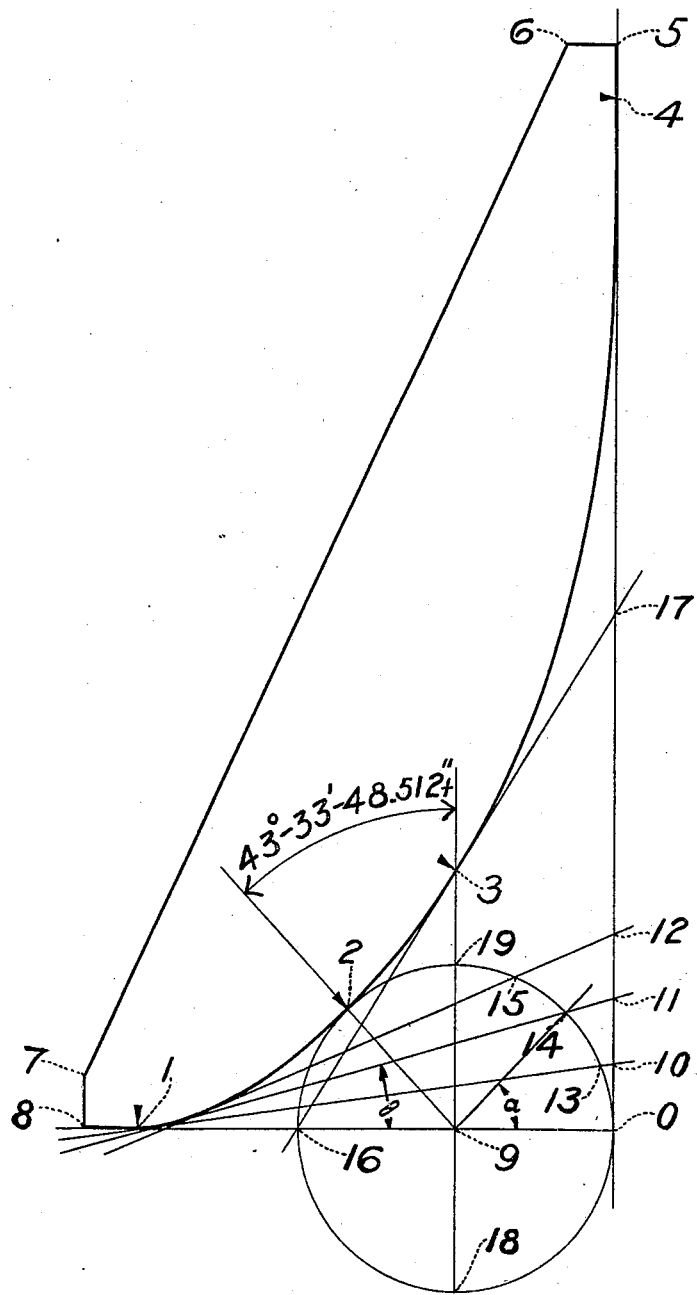
WITNESSES:
Wilson S. Barley.
Dempsey L. Reehl.
INVENTOR:
Roy Allen Mather.

UNITED STATES PATENT OFFICE.

ROY ALLEN MATHER, OF PITTSBURG, PENNSYLVANIA.

RECTIFYING-CURVE.

992,371.  Specification of Letters Patent.  Patented May 16, 1911.

Application filed May 25, 1909. Serial No. 498,339.

*To all whom it may concern:*

Be it known that I, ROY ALLEN MATHER, a citizen of the United States, residing at Pittsburg, in the county of Allegheny and State of Pennsylvania, have invented a new and useful Drawing Instrument Known as the "Rectifying-Curve," of which the following is a specification.

My invention relates to drafting in general, where the rectifying curve may be used to lay off graphically on a straight line the exact length of any circular arc; to lay off on a circular arc the true length of a given straight line; or to divide a circular arc into any number of equal parts, or proportionally to any given ratios. I attain these objects by means of the rectifying curve, shown in the accompanying drawing which forms a part of these specifications.

The rectifying curve may be made of wood, metal, rubber, celluloid or any other suitable material capable of being finished to a smooth and uniform edge, and of a uniform thickness of about one-eighth ($\frac{1}{8}$) inch.

Referring to the drawing, 1—2—3—4—5—6—7—8 is a plan of the rectifying curve, represented as lying on the drawing board in connection with rectangular base lines 0—1 and 0—4, and a base circle centered at 9. The body of the curve may be solid as shown, although this is not essential. The edge 4—5—6—7—8—1 may be of any desirable shape. The edge 1—2—3—4, or rectifying arc, is made preferably at right angles to the plane of the parallel faces projected in plan, and its shape is the particular object of this invention, being defined as follows: The rectifying arc may be made to any scale and depends on the diameter of the adopted base circle. Line 0—1 is an extended diameter of the base circle, and the rectifying arc is tangent to this line at 1, three times the radius of the base circle from 0. Line 0—4 is tangent to the base circle at 0, and the rectifying arc is tangent to this line at 4, a distance equal to the circumference of the base circle from 0. Points 1 and 4, thus defined, form the extreme limits of the rectifying arc. To find intermediate points, divide 0—4 into any number of equal parts, as 0—10, 10—11, 11—12, etc.; also divide the circumference of the base circle into the same number of equal parts, as 0—13, 13—14, 14—15, etc.; then lines 10—13, 11—14, 12—15, etc., produced if necessary, will be tangent to the rectifying arc, and the intersection of any two such lines an infinitesimal angular distance apart determines a point on the rectifying arc. Thus the rectifying arc is the locus of the intersections or tangent points of all such tangent or rectifying lines taken in successive order from 0 counterclockwise around the base circle. It may be thus developed in any one of the four quadrants about point 0. The curve can be laid out readily by drawing a sufficient number of these tangent or rectifying lines 10—13, 11—14, 12—15, etc.; then, with a set of railroad curves or other equivalents, drawing from 1 to 4 a regularly changing and continuous curve tangent to these rectifying lines. This relation has been mathematically expressed, and rectangular coördinates have been computed, with 0 as an origin and 0—1 and 0—4 as axes, from which the whole arc, 1—2—3—4, can be practically and accurately laid out in the manufacture of the rectifying curve.

The form of the mathematical equation of the rectifying arc I do not regard as important, since it may have an indefinite number of equivalent expressions depending on the position of the origin with respect to the center of the base circle, and on the coördinate axes, whether they be rectangular or oblique. The essential characteristic of the rectifying curve is that any line tangent to it intercepts from 0 equal distances on both the circumference of the base circle and the axes 0—4.

The development of a mathematical equation to the rectifying curve whose tangents embody the above defined "essential characteristic" is as follows: Refer the rectifying curve to a pair of rectangular axes, as 0—1 as the axis of X and 0—4 as the axis of Y, with the origin at 0. Consider any right tangent to the rectifying curve, as 11—14. Denote the angle between 11—14 and 0—1 as $\theta$. Denote the corresponding angle 0—9—14 of the base circle as $a$. $R=0—9=$ radius of the base circle. The Y intercept of 11—14=

0—11=Ra. Therefore the rectangular equation of 11—14 referred to the origin 0 is, in terms of $x$, $y$ and $a$, $$y = \frac{x(a - \sin. a)}{1 - \cos. a} + Ra \quad \text{(1.)}$$

The successive positions of line 11—14 are enveloped by the rectifying arc. Any two of these successive positions of line 11—14 an infinitesimal angular distance apart are respectively tangent to the required arc at points less than any assignable distance apart as increment $a$, approaches zero. Hence the coördinates of the tangent points of two such lines when increment $a=0$ will be simultaneous and coördinates of a point on the desired locus. Differentiate equation (1) with respect to $a$ and obtain the equation of a 2nd position of line 11—14, coinciding with the position of equation (1) at the limit increment $a=0$; and $x$ and $y$ of the required locus will be simultaneous in these two equations. From the differentiation of equation (1) is obtained, $$x = \frac{-R(1 - \cos. a)^2}{2(1 - \cos. a) - a \sin. a} \quad \text{(2.)}$$

Substituting this value of $x$ in equation (1) and, $$y = Ra - \frac{R(1 - \cos. a)(a - \sin. a)}{2(1 - \cos. a) - a \sin. a} \quad \text{(3.)}$$

Equations (2) and (3) are the rectangular equations to the rectifying curve. In the investigation of equations (2) and (3) for the maximum values of $x$ and $y$, it is found: Firstly, in equation (2) when $a=o$ $$x = \frac{o}{o}.$$

On investigation of this indeterminate form through four differentiations, is is finally determined that $x=-3R$. Hence, for $a=o$, $x=-3R$, and $y=o$, and the rectifying curve touches the axis of $x$ or 0—1 at 1, three times the radius of the base circle from 0. But $\theta=o$ when $a=o$, and the rectifying tangent 11—14 coincides with 0—1; hence, the rectifying curve is tangent to 0—1 at 1, as previously stated in these specifications. In the same manner it is proven that the rectifying curve is tangent to 0—4 at 4, a distance from 0 equal to $2\pi R$, as will be seen by putting $2\pi$ for "$a$" in equation 3 above, and differentiating once for a definite value of $y$.

The rectifying arc may be known further by the following properties:

1. It is tangent to the base circle at a radial line which makes an angle of 43°—33'—48.512"+ with diameter 18—19. Diameter 18—19 is parallel to 0—4.

2. It intersects the diameter 18—19 produced, at 3, where 9—3 equals a quadrant distance 0—19 of the base circumference.

3. Point 3 is also the point of tangency of a tangent to the rectifying arc drawn through 16, the upper extremity of diameter 0—16.

I may prefer to scribe all of these points, 1, 2, 3, 4, on the edge of the rectifying curve, in order to set it readily in correct juxtaposition with the base circle, as will be required in its particular use as a rectifying arc.

I make use of the rectifying curve, as a basic operation in the solution of certain problems, as follows: Set the rectifying curve in its correct relation to the base circle by means of points 1 and 4 touching respectively lines 0—1 and 0—4, and intersecting 9—3 at point 3; 1 being three times the radius of the base circle from 0; then, I. To find the length of any arc, as 0—16 on the base circumference, place a straightedge at 16 and touching the rectifying curve. Draw 16—17, a line along the straightedge intersecting 0—4 at 17; then 0—17 is the true length of arc 0—16, or it is arc 0—16 rectified.

II. To lay off any length, as 0—12, on the circumference of the base circle, place a straightedge at 12 and touching the rectifying curve. Draw 12—15, a line along the straightedge intersecting the circumference at 15; then 0—15 is the required length.

III. To divide any arc, as 0—15 of the base circle into any equal or proportional number of parts, rectify 0—15 as explained in case I. Divide the rectified arc 0—12 into any number of equal or proportional parts, as 0—10, 10—11 and 11—12. Place a straightedge at 10, 11 and 12 respectively, touching the rectifying curve, and draw lines along the straightedge intersecting the circumference at 13, 14 and 15; then 0—13, 13—14 and 14—15 are the desired number of equal or proportional parts of arc 0—15.

To perform these operations on a given circumference of greater or lesser radius than that of the base circle, I first operate on a similar arc of the base circle, as described in cases I, II, and III, then reduce the results, by the relation of similar triangles, to the given circumference.

I am aware that regular and irregular curves have been made, prior to my invention, for the purpose of drawing curved lines; and I do not make any claims in this direction, although my invention may be thus used; but I am not aware that the rectifying arc herein defined ever was known or made use of previous to my invention.

I am also aware that there has been patented "a drafting implement comprising a plate or sheet of material having one edge curved in accordance with the equation $$y = x \cot \frac{x}{r},"$$

and that the functions of this curve are essentially the same as those of the "rectifying curve" described in these specifications. See patent to William J. Varley, No. 831,314, Sept. 18, 1906, "Apparatus for drafting and measuring angles." I desire to show that the curve of the form $$y = x \cot \frac{x}{r}$$

is not the rectifying curve described in these specifications. As shown in the specifications and drawings of No. 831,314, the curve $$y = x \cot \frac{x}{r}$$

is concave to the base circle. It has a branch of infinite length, since, if $x = 180$ degrees, $\cot x = $ infinity, and $y$ equals infinity. On the other hand, my rectifying curve is convex to the base circle, and is a curve of finite length for a finite base circle, as described and indicated in these specifications.

I claim:

1. Any drawing instrument or other device composed of a plate or sheet of material having one edge curved in accordance with the equations, $$x = \frac{-R(1 - \cos a)^2}{2(1 - \cos a) - a \sin a}$$

and $$y = Ra - \frac{R(1 - \cos a)(a - \sin a)}{2(1 - \cos a) - a \sin a},$$

referred to an origin at the intersection of one diametral and one tangential axis of a base circle and at right angles to each other, $x$ being measured along the diametral axis and $y$ along the tangential axis, substantially as herein shown and defined.

2. Any drawing instrument or other device composed of a plate or sheet of material having one edge curved in accordance with the equations, $$x = \frac{-R(1 - \cos a)^2}{2(1 - \cos a) - a \sin a}$$

and $$y = Ra - \frac{R(1 - \cos a)(a - \sin a)}{2(1 - \cos a) - a \sin a},$$

referred to an origin at the intersection of one diametral and one tangential axis of a base circle and at right angles to each other; with said curved edge produced from its tangent points on these axes along said axes to any desired length and with edges perpendicular to these prolongations to any desired length, all substantially as herein shown and defined.

3. Any drawing instrument or other device composed of a plate or sheet of material having one edge curved in accordance with the equations, $$x = \frac{-R(1 - \cos a)^2}{2(1 - \cos a) - a \sin a}$$

and $$y = \frac{Ra - R(1 - \cos a)(a - \sin a)}{2(1 - \cos a) - a \sin a},$$

referred to an origin at the intersection of one diametral and one tangential axis of a base circle and at right angles to each other; and with the remaining edges of any desired shape, all substantially as herein shown and defined.

4. Any drawing instrument or other device composed of a plate or sheet of material having one edge so curved that any right line tangent to it intercepts equal distances respectively, from an origin on a base circle, firstly, on and measured around the base circumference, and secondly, along a tangential axis, substantially as herein shown and defined.

ROY ALLEN MATHER.

Witnesses:
WILSON S. BARLEY,
DEMPSEY L. REEHL.